United States Patent
Priyadarshi et al.

(10) Patent No.: US 10,474,462 B2
(45) Date of Patent: Nov. 12, 2019

(54) DYNAMIC PIPELINE THROTTLING USING CONFIDENCE-BASED WEIGHTING OF IN-FLIGHT BRANCH INSTRUCTIONS

(71) Applicant: QUALCOMM Incorporated, San Diego, CA (US)

(72) Inventors: Shivam Priyadarshi, Morrisville, NC (US); Rami Mohammad Al Sheikh, Raleigh, NC (US); Raguram Damodaran, San Diego, CA (US); Michael Scott McIlvaine, Raleigh, NC (US); Jeffrey Todd Bridges, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 15/057,116

(22) Filed: Feb. 29, 2016

(65) Prior Publication Data

US 2017/0249149 A1    Aug. 31, 2017

(51) Int. Cl.
*G06F 9/30* (2018.01)
*G06F 9/38* (2018.01)

(52) U.S. Cl.
CPC ...... *G06F 9/30083* (2013.01); *G06F 9/30021* (2013.01); *G06F 9/30058* (2013.01); *G06F 9/30145* (2013.01); *G06F 9/3802* (2013.01); *G06F 9/3836* (2013.01); *G06F 9/3867* (2013.01)

(58) Field of Classification Search
None
See application file for complete search history.

(56) References Cited

U.S. PATENT DOCUMENTS

| 6,269,438 B1 | 7/2001 | Chang |
| 6,928,537 B2 | 8/2005 | Henry et al. |
| 7,979,725 B2 | 7/2011 | Atkinson |

(Continued)

FOREIGN PATENT DOCUMENTS

| GB | 2515076 A | 12/2014 |

OTHER PUBLICATIONS

Lee C.J., et al., "Performance-Aware Speculation Control using Wrong Path Usefulness Prediction", IEEE 14th International Symposium on High Performance Computer Architecture, HPCA 2008, Feb. 16, 2008, pp. 1-11.

(Continued)

*Primary Examiner* — John M Lindlof
(74) *Attorney, Agent, or Firm* — Muncy, Geissler, Olds & Lowe, P.C./Qualcomm

(57) ABSTRACT

Systems and methods for operating a processor include determining confidence levels, such as high, low, and medium confidence levels, associated with in-flight branch instructions in an instruction pipeline of the processor, based on counters used for predicting directions of the in-flight branch instructions. Numbers of in-flight branch instructions associated with each of confidence levels are determined. A weighted sum of the numbers weighted with weights corresponding to the confidence levels is calculated and the weighted sum is compared with a threshold. A throttling signal may be asserted to indicate that instructions are to be throttled in a pipeline stage of the instruction pipeline based on the comparison.

30 Claims, 4 Drawing Sheets

(56) References Cited

U.S. PATENT DOCUMENTS

| | | |
|---|---|---|
| 8,006,070 B2 | 8/2011 | Gschwind et al. |
| 9,442,726 B1* | 9/2016 | Bonanno ............... G06F 9/3806 |
| 2004/0215988 A1* | 10/2004 | Clabes .................... G06F 1/206 |
| | | 713/300 |
| 2006/0174090 A1 | 8/2006 | Sartorius et al. |
| 2007/0288736 A1* | 12/2007 | Luick .................... G06F 9/3848 |
| | | 712/240 |
| 2012/0124345 A1* | 5/2012 | Denman ............... G06F 9/3804 |
| | | 712/237 |

OTHER PUBLICATIONS

International Search Report and Written Opinion—PCT/US2017/016704—ISA/EPO—dated Jun. 13, 2017.

* cited by examiner

DYNAMIC PIPELINE THROTTLING USING CONFIDENCE-BASED WEIGHTING OF IN-FLIGHT BRANCH INSTRUCTIONS

FIELD OF DISCLOSURE

Disclosed aspects relate to power reduction in processors. More particularly, exemplary aspects are directed to dynamic throttling of a processor's instruction pipeline by weighting in-flight branch instructions based on confidence levels associated with predictions of the in-flight branch instructions.

BACKGROUND

Instruction pipelines of processors are designed to process instructions in multiple pipeline stages, in successive clock cycles. To improve performance, some instructions may be executed out of program order in the instruction pipeline, wherein, instructions like branch instructions may be speculatively executed based on a prediction of their direction. If a branch instruction is predicted "taken," control flow is transferred to a branch target address of the taken branch instruction and instructions are to be fetched and processed from the branch target address. If the branch instruction is predicted "not-taken," then control flow does not change and instructions following the branch instructions are to be fetched and processed. In either case if the branch is incorrectly predicted (or mispredicted) as taken or not-taken, then instructions would have been fetched and executed down a wrong-path and these wrong-path instructions will be flushed or thrown away once the misprediction is realized several clock cycles after the branch was incorrectly predicted. Therefore, fetching and executing wrong-path instructions leads to unnecessary power consumption and utilization of resources of the processor.

A conventional approach to reducing power consumption associated with wrong-path instructions involves determining a number of speculatively executed branches that are still unresolved or in-flight in a processor pipeline. Based on this number (e.g., if it is above or below a specified threshold), decisions are made whether to throttle the fetching of new instructions. This approach is based on the notion that if a large number of branch instructions are unresolved, there is a higher likelihood that at least some of these branch instructions were mispredicted and therefore, at least some wrong-path instructions may be fetched and executed due to these likely mispredictions. Thus, according to this approach, fetching future instructions are stalled (or, as referred to herein, the pipeline is throttled) until the number of in-flight branch instructions in the pipeline decreases.

However, the above conventional approach suffers from the drawback that all in-flight branch instructions are essentially treated as having the same likelihood of being mispredicted. In practical applications, this assumption may be incorrect because the prediction accuracies may vary for different branch instructions. Therefore, the conventional approaches to pipeline throttling may hurt performance due to the inaccurate manner in which throttling is applied.

Accordingly, there is a need in the art to avoid the drawbacks of the above-described conventional approach and reducing wasteful power consumption associated with wrong-path instructions while minimizing any impact on performance.

SUMMARY

Exemplary aspects of the invention are directed to systems and method for operating a processor. Exemplary systems and methods relate to determining confidence levels, such as high, low, and medium confidence levels, associated with in-flight branch instructions in an instruction pipeline of the processor, based on counters used for predicting directions of the in-flight branch instructions. Numbers of in-flight branch instructions associated with each of confidence levels are determined. A weighted sum of the numbers weighted with weights corresponding to the confidence levels is calculated and the weighted sum is compared with a threshold. The comparison can reveal, with high accuracy, an indication of whether in-flight branch instructions are correctly predicted or mispredicted, and correspondingly, the likelihood of there being wrong-path instructions in the pipeline. If it is determined that there are likely to be wrong-path instructions in the pipeline in this manner, then in exemplary aspects of this disclosure, a throttling signal can be provided to indicate that instructions are to be throttled in a pipeline stage of the instruction pipeline. Correspondingly, processing of instructions can be throttled, e.g., at any pipeline stage of the instruction pipeline, such as a fetch stage, a decode stage, etc. based on the throttling signal. In this manner, wasteful power consumption associated with fetching and/or executing wrong-path instructions in the instruction pipeline can be reduced.

Accordingly, an exemplary aspect is directed to a method of operating a processor, the method comprising determining confidence levels associated with in-flight branch instructions in an instruction pipeline of the processor, determining numbers of in-flight branch instructions associated with each of the confidence levels, determining a weighted sum of the numbers weighted with weights corresponding to the confidence levels, comparing the weighted sum with a threshold, and providing a throttling signal to indicate that instructions are to be throttled in a pipeline stage of the instruction pipeline based on the comparison.

Another exemplary aspect is directed to an apparatus comprising confidence fields configured to store confidence levels associated with in-flight branch instructions in an instruction pipeline. The apparatus also includes a throttler comprising confidence level blocks configured to determine numbers of in-flight branch instructions associated with each of the confidence levels, a weighted sum block configured to determine a weighted sum of the numbers weighted with weights corresponding to the confidence levels, and a comparator configured to compare the weighted sum with a threshold and provide a throttling signal to indicate that instructions are to be throttled in a pipeline stage of the instruction pipeline based on the comparison.

Yet another exemplary aspect is directed to an apparatus comprising means for storing confidence levels associated with in-flight branch instructions in an instruction pipeline of a processor, means for determining numbers of in-flight branch instructions associated with each of the confidence levels, means for determining a weighted sum of the two or more counts weighted with weights corresponding to the confidence levels, means for comparing the weighted sum with a threshold, and means for providing a throttling signal to indicate that instructions are to be throttled in a pipeline stage of the instruction pipeline based on the comparison.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1A:
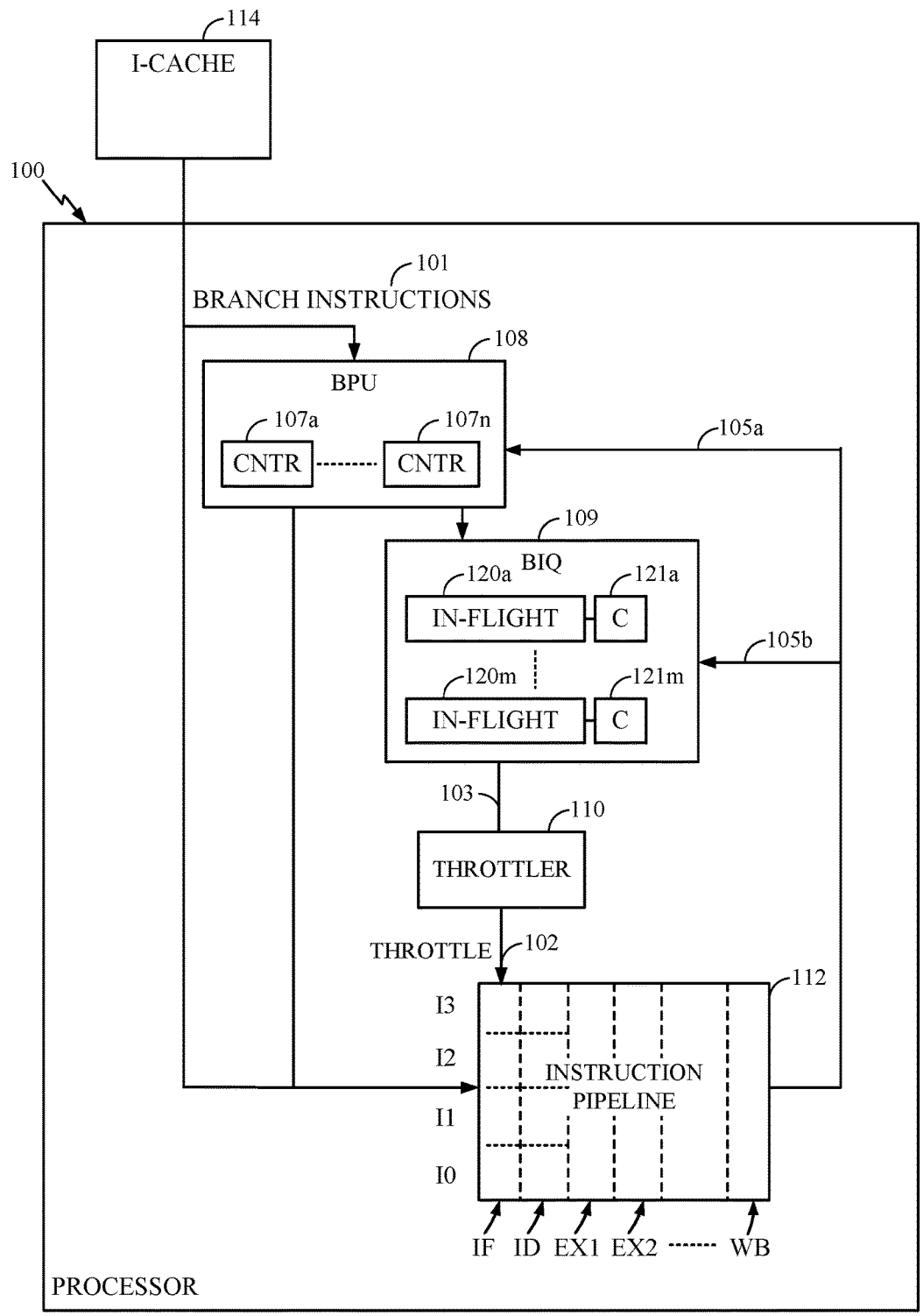
FIG. 1A illustrates a schematic view of a processor configured according to an exemplary aspect of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In exemplary aspects of this disclosure, wasteful power consumption associated with wrong-path instructions is reduced. Branch instructions that are in-flight in an instruction pipeline of an exemplary processor are provided with different confidence levels (e.g., low, medium and high confidence). The confidence levels are derived from branch prediction mechanisms used to predict the branches, for example, from count values of branch prediction counters associated with each branch instruction. Based on the count values, the in-flight branch instructions are classified under different categories (e.g., low, medium, and high confidence categories). The number of branch instructions in each category are counted and weighted with a weight associated with the particular category to obtain a weighted sum. The weighted sum is then compared with a threshold, which may be dynamically determined in some aspects, based, for example, on a number of mispredictions in a unit number of instructions. For example, the number of mispredictions per thousand (or kilo) instructions (also referred to as MPKI) can be used as the threshold.

The comparison reveals, with high accuracy, an indication of whether in-flight branch instructions are correctly predicted or mispredicted, and correspondingly, the likelihood of there being wrong-path instructions in the pipeline. In exemplary aspects, the instruction pipeline may be throttled based on the comparison of the weighted sum to the threshold. In exemplary aspects, any pipeline stage of an instruction pipeline can be throttled, and throttling need not be limited to stalling the fetching of new instructions. For example, the throttling can also be implemented in an instruction decode stage, such that decoded instructions may be held from being issued to the various execution units in the execution stages of the pipeline.

In some examples, the branch prediction counters can be implemented as saturating counters (e.g., 3-bit signed counters). Moreover, in exemplary aspects, it is observed that newly allocated counters, i.e., counters which are newly associated with a particular branch instruction, are likely to have a poor correlation with the confidence levels, and therefore the newly allocated counters are treated as being indicative of high confidence, in order to avoid unnecessary throttling and performance degradation.

With reference now to FIG. 1A, processor 100 configured according to exemplary aspects of this disclosure is illustrated. Processor 100 can be a general purpose processor, special purpose processor such as a digital signal processor (DSP), etc., and in some aspects, can be a superscalar processor configured to fetch and execute two or more instructions in parallel in each clock cycle. Processor 100 can be coupled to instruction cache or I-cache 114. Processor 100 may be configured to receive one or more instructions from I-cache 114 and execute the instructions using for example, instruction pipeline 112.

Instruction pipeline 112 may include one or more pipelined stages, representatively illustrated as stages: instruction fetch (IF), instruction decode (ID), one or more execution stages EX1, EX2, etc., and a write back (WB) stage. In an example, instructions I0, I1, I2, and I3 are shown to enter IF stage of instruction pipeline 112 in parallel to illustrate that processor 100 can be a superscalar processor.

One or more instructions which are fetched and executed in instruction pipeline 112 can be branch instructions. The direction of some branch instructions, such as conditional branch instructions, may not be known when they are newly fetched. Accordingly, branch prediction mechanisms such as a branch prediction unit (BPU) 108 may be employed to predict the direction in which these branch instructions (designated by the reference numeral 101) will resolve in later stages of instruction pipeline 112 (e.g., once the condition is resolved in one of the execution stages). Once execution is completed (e.g., in an execution stage or WB stage) or when branch instruction 101 is resolved in instruction pipeline 112, the correct direction or evaluation 105a is provided to BPU 108, based on which it is determined whether the prediction was correct or incorrect. If the prediction was incorrect (or there was a "misprediction"), then instructions following the mispredicted branch instruction 101 would have been fetched and executed down a wrong-path and therefore may be flushed.

Branch instructions 101 are said to be in-flight while they are unresolved (i.e., it is not yet known whether they were correctly predicted) and traversing through the stages of instruction pipeline 112. Mechanisms such as branch instruction queue (BIQ) 109 may comprise information about the in-flight branch instructions and be used to keep track of in-flight branch instructions. BPU 108 and BIQ 109 will now be explained in further detail.

Considering BPU 108 in more detail, BPU 108 can comprise one or more state machines used for predicting direction of one or more branch instructions 101. These state machines provide predictions for branch instructions 101, e.g., in the IF stage, based on which branch instructions 101 are speculatively executed. Although not shown, a history of such predictions and evaluations of conditional branch instructions (e.g., a pattern of taken/not-taken) that traverse or have traversed through an instruction pipeline of processor 100 can also be tracked (e.g., in a branch history table or "BHT" as known in the art). As branch instructions 101 are fetched, BPU 108 can be accessed to lookup predictions from corresponding state machines. The corresponding state machine for a branch instruction 101 can be accessed using an address (e.g., program counter or "PC" value) of the branch instruction 101, or the address may be combined with other information, such as the BHT to access a state machine.

In exemplary aspects, the state machines of BPU 108 can comprise multi-bit counters illustrated as "n" counters 107a-n. Counters 107a-n may be implemented as 2-bit counters, 3-bit counters, etc., which can be incremented or decremented to provide two or more distinct count values. The count values may be used to derive confidence levels of the predictions in exemplary aspects.

In an example, counters 107a-n may be implemented as 3-bit counters. A 3-bit counter can be incremented or decremented to generate 8 possible count values. If a signed notation is used for the 8 possible count values, the count values can belong to the set of decimal numbers {−4, −3, −2, −1, 0, +1, +2, +3}. These 8 count values can be grouped into two or more groups with each group indicative of a confidence level. In one implementation the count values are divided into three groups to represent low, medium, and high confidence (while keeping in mind that various other groupings or numbers of confidence levels are possible). Thus, in an implementation with three groups, the numbers {−4, −3} and {+2, +3} are treated as being representative of high confidence, the numbers −2 and +1 are treated as being representative of medium confidence, and the numbers −1, and 0 are treated as being representative of low confidence. This implementation of counters 107a-n as 3-bit signed counter in exemplary aspects will now be discussed in greater detail.

Each one of counters 107a-n is incremented if and when a corresponding branch instruction 101 evaluates to "taken" and decremented if and when the corresponding branch instruction 101 evaluates to "not-taken." When branch instructions 101 are fetched, they access their corresponding counters 107a-n in BPU 108 (as discussed previously, based on their PC values, BHT, or combinations thereof) and if the corresponding count values are 0, +1, +2, or +3, branch instructions 101 may be speculatively executed down the taken path, for example, and if the count values are −1, −2, −3, or −4, they may be correspondingly executed down the not-taken path. The count values are updated based on evaluation 105a for each of the branch instructions 101, once the branch instructions 101 resolve.

With the above-outlined approach, it is seen that there is a built-in resilience or bias to the predictions based on count values. For example, if the branch instruction 101 consistently evaluates to "taken," the count value of the corresponding counter 107a-n can reach count values of +2 or +3 (corresponding to a "taken" prediction), wherein it would take two or more consecutive evaluations to "not-taken" in order to bring the count value down to a −1 (corresponding to a "not-taken" prediction). In other words one or two predictions in a direction opposite to a branch instruction's otherwise consistent behavior may not affect the prediction. The number of evaluations in an opposite direction that can cause a change in the prediction may be based on particular count values. Accordingly, count values of +2, +3 in the taken direction and −3, −4 in the not-taken direction indicate the strongest predictions. On similar lines, count values −2 or +1 provide predictions of intermediate strength (between strongest and weakest), and count values −1 or 0 provide the weakest predictions.

As previously mentioned, the strength of a prediction based on count value is used as a measure of confidence of the prediction in exemplary aspects, wherein the presence of a number of low confidence in-flight branch instructions in processor 100 can provide a trigger to throttle instruction pipeline 112. As previously mentioned BIQ 109 can track in-flight branch instructions. In further detail, when a branch instruction 101 is fetched, BPU 108 is accessed to obtain the prediction for the branch instruction 101. Additionally, an entry is created in BIQ 109 to hold information pertaining to the branch instruction 101 (e.g., the PC value, predicted direction, etc.) while the branch instruction 101 is in-flight. As shown, entries 120a-m are created for "m" in-flight branch instructions when each of the corresponding m branch instructions 101 are fetched and access BPU 108. Once a branch instruction 101 resolves, along with the actual evaluation 105a of the branch instruction 101 provided to BPU 108, an indication 105b that the branch instruction 101 has resolved is also provided to BIQ 109. Based on indication 105b, the entry 120a-m corresponding to the branch instruction 101 is deleted. Thus, if there is an entry 120a-m in BIQ 109, for a branch instruction 101, then the branch instruction 101 is in-flight.

Along with entries 120a-m, in exemplary aspects, BIQ 109 also includes corresponding entries or confidence fields (e.g., implemented as registers or other storage means) for storing confidence levels, wherein the confidence fields are representatively shown as "C" 121a-m in FIG. 1A for the corresponding in-flight branch instructions in entries 120a-m. Confidence values in confidence fields 121a-m are based on the strength of prediction derived from counters 107a-n for the in-flight branch instructions whose information is stored in entries 120a-m. Based on the aforementioned 3-bit counter implementations for counters 107a-n, confidence values in confidence fields 121a-m corresponding to in-flight branch instructions in entries 120a-m whose count values are −4, −3, +2, or +3 are designated as "high confidence" (e.g., C="11" in an implementation where confidence fields 121a-m are each 2-bits wide); and similarly, count values −2 or +1 are designated as "medium confidence" (e.g., C="10" or "01"); and count values −1 or 0 are designated as "low confidence" (e.g., C="00").

However, it is noted that for counters 107a-n which are newly created or assigned to a branch instruction 101, the corresponding confidence fields 121a-m are initialized to reflect "high confidence" in some aspects. This is because when a counter 107*a-n* is first allocated to a particular branch instruction 101, the counter 107*a-n* may not have a good correlation to the behavior of branch instruction 101 (e.g., before the counter 107*a-n* has had time to settle in or saturate to count value to provide a stable prediction). But by designating the confidence value in corresponding confidence field 121*a-m* of such a newly assigned counter 107*a-n* as "low confidence" may lead to unnecessary pipeline throttling. Therefore, confidence fields 121*a-m* are initialized to reflect "high confidence" (e.g., C="11") for corresponding entries 120*a-m* comprising in-flight branch instructions whose predictions are based on newly allocated counters 107*a-n* in exemplary aspects.

Confidence fields 121*a-m* for in-flight branch instructions in entries 120*a-m* of BIQ 109 are used in throttler 110 for making throttling decisions, as will now be explained. While FIG. 1A also shows a block designated as throttler 110 in processor 100, an exploded view of throttler 110 is provided in FIG. 1B. Accordingly, a combined reference to FIGS. 1A-B will be used in explaining throttler 110. Throttler 110 receives the confidence values from confidence fields 121*a-m* of BIQ 109 (e.g., on the path designated by the reference numeral 103), for one or more in-flight branch instructions whose information is stored in entries 120*a-m*. Throttler 110 comprises three blocks (which may be implemented in hardware using registers or other memory structures, and/or in a suitable combination of hardware and software) designated as high confidence 110A, medium confidence 110B, and low confidence 110C. These three blocks, high confidence 110A, medium confidence 110B, and low confidence 110C, are configured to count or determine the number of in-flight branch instructions (in entries 120*a-m*) which have corresponding high, medium, and low confidence, i.e., whose confidence values in confidence fields 121*a-m* indicate corresponding high, medium, and low confidence values (keeping in mind that one or more of the counts or numbers of in-flight branch instructions with a particular confidence level may be zero).

Throttler 110 is configured to assign weights for each of the three blocks, high confidence 110A, medium confidence 110B, and low confidence 110C. The weights may be statically assigned, e.g., by a programmer, or in some implementations the weights can be dynamically changed. In some example implementations, higher weights may be provided to medium confidence 110B and low confidence 110C, compared to weights of high confidence 110A to trigger throttling if there are relatively fewer low/medium confidence in-flight branch instructions. The block designated as weighted sum 120 is configured to determine a weighted sum of the number of low, medium, and high confidence in-flight branch instructions at any instance of time, as obtained from high confidence 110A, medium confidence 110B, and low confidence 110C, respectively.

Throttler 110 is also shown to include comparator 122 and a signal line designated as threshold 124. Threshold 124 may be provided as an input to throttler 110. Threshold 124 may vary, for example, based on the phase of a program or application being executed on processor 100. For example, threshold 124 can be a dynamically determined value based on the number of branch mispredictions per unit number of instructions. In this disclosure, a metric referred to as mispredictions per thousand (or kilo) instructions (MPKI) provides an indication of how many conditional branch instructions mispredicted for every 1000 committed instructions. Based on MPKI, the threshold can be set for the next 1000 instructions to be executed in processor 100. For example, if the MPKI is low, then threshold 124 is set to a value which does not cause throttle 102 to be asserted (i.e., to not trigger throttling) unless the overall confidence of in-flight branch instructions (e.g., output of weighted sum 120) is low. On the other hand, if MPKI is high, then threshold 124 is set to a value which causes throttle 102 to be triggered and throttling to be performed, unless the output of weighted sum is high.

The output, throttle 102 generated in the above manner from throttler 110 controls throttling in instruction pipeline 112 as follows. If, for example, throttler 110 determines that there are a large number of in-flight branch instructions with low confidence (e.g., weighted sum 120 generates a high value, based on a high weight given to low confidence 110C, in comparison to threshold 124) then it may be very likely that processor 100 is executing wrong-path instructions. In other words, there may be a high likelihood that wrong-path instructions are fetched from I-cache 114 and executed in instruction pipeline 112. To mitigate this scenario, throttler 110 may provide a throttling signal to indicate that instructions are to be throttled. For example, throttler 110 may assert the throttling signal, throttle 102, to indicate that instruction pipeline 112 is to be throttled.

Based on the throttling signal, throttle 102, instruction pipeline 112 may be throttled in any pipeline stage. For example, instruction pipeline 112 may be throttled at the IF stage in some implementations, which means that instruction fetching from I-cache 114 may be stalled. In another example, instruction pipeline 112 may be throttled following the ID stage, which means that decoded instructions may be held from being issued to the various execution units in the execution stages. Any other suitable throttling can be applied in instruction pipeline 112 based on throttle 102 in particular implementations.

On the other hand, if throttler 110 determines that the majority of in-flight branch instructions are high confidence branch instructions, then it may be very likely that processor 100 is executing correct-path instructions, and therefore, throttler 110 does not provide a throttling signal, or in other words, throttle 102 is not asserted.

In this manner, throttler 110 can determine when to throttle instruction pipeline 112, with a high degree of accuracy based on confidence levels of in-flight branch instructions, thereby reducing power consumption (by avoiding wasteful fetching and execution of wrong-path instructions) without affecting performance.

Figure 2:
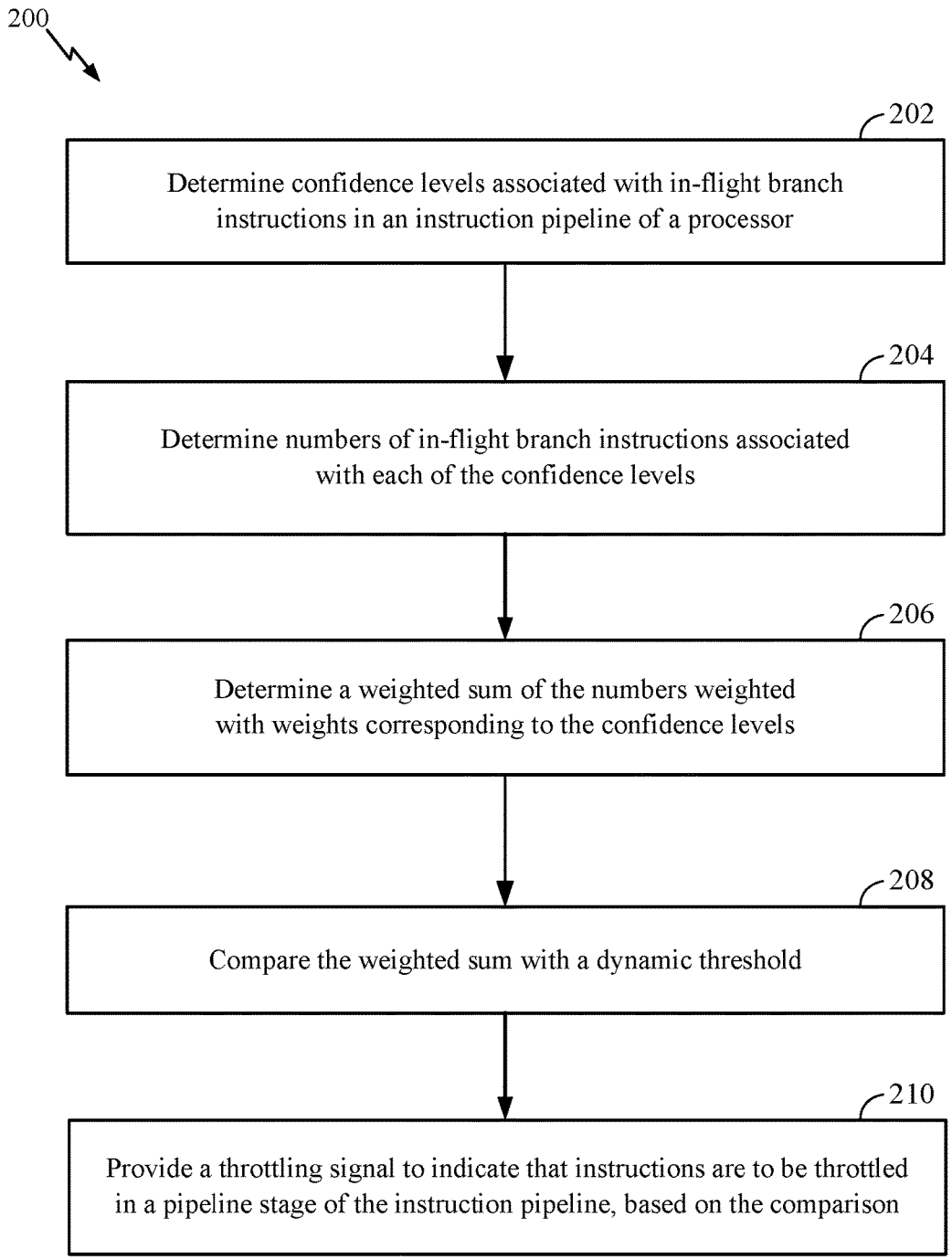
FIG. 2 illustrates a process flow for operating the processor, according to an exemplary aspect of this disclosure.

Accordingly, it will be appreciated that exemplary aspects include various methods for performing the processes, functions and/or algorithms disclosed herein. For example, FIG. 2 illustrates method 200 for processing instructions. Method 200 can be performed, for example, in processor 100.

In Block 202, method 200 comprises determining confidence levels associated with in-flight branch instructions in an instruction pipeline of the processor. For example, Block 202 comprises associating high, medium, or low confidence levels in confidence fields 121*a-m* of BIQ 109, corresponding to entries 120*a-m* comprising information regarding in-flight branch instructions (e.g., addresses and predictions of the in-flight branch instructions) in instruction pipeline 112, wherein an entry 120*a-m* for an in-flight branch instruction in BIQ 109 may be created upon accessing BPU 108 comprising counters 107*a-n* used for determining a prediction of the in-flight branch instruction and wherein the entry 120*a-m* may be deleted based on indication 105*b* that the in-flight branch instruction has resolved in instruction pipeline 112. As noted, counters 107*a-n* may be 3-bit signed counters which are incremented when corresponding in-flight branch instructions evaluate to taken (e.g., evaluation 105a), and decremented when corresponding in-flight branch instructions evaluate to not-taken. In some cases, the confidence level in confidence fields $121a\text{-}m$ for a counter $107a\text{-}n$ newly allocated to an in-flight branch instruction is assigned a high confidence level, to prevent unnecessary throttling.

Block 204 comprises determining numbers of in-flight branch instructions associated with each of the confidence levels. For example, Block 204 comprises determining in high confidence block 110A, medium confidence block 110B, and low confidence block 110C of throttler 110, the number of high, medium, and low confidence in-flight branch instructions, respectively, based for example on the confidence levels stored in confidence fields $121a\text{-}m$.

Block 206 comprises determining a weighted sum of the numbers weighted with weights corresponding to the confidence levels. For example, Block 206 comprises determining the weighted sum in weighted sum 120 of throttler 110. In some cases, weights may be assigned by assigning higher weights for low and medium confidence levels, compared to weights for high confidence levels.

Block 208 comprises comparing the weighted sum with a threshold. For example, comparator 122 may be used for comparing the output of weighted sum 120 with threshold 124, wherein threshold 124 may be based on behavior of branch instructions 101 in a unit number of previously committed instructions in instruction pipeline 112 (e.g., a number of mispredictions of branch instruction in a thousand previously committed instructions).

Block 210 comprises providing a throttling signal to indicate that instructions are to be throttled in a pipeline stage of the instruction pipeline, based on the comparison. For example, Block 210 can include asserting throttle 102, by throttler 110 if weighted sum 120 is less than threshold 124, to indicate that instruction pipeline 112 is to be throttled in a pipeline stage, such as a fetch stage or an issue stage.

Moreover, it will also be understood that exemplary aspects may include any apparatus comprising means for performing the functions described herein (e.g., functions described with reference to method 200 of FIG. 2). For example, an apparatus (e.g., processor 100) can include means for storing confidence levels associated with in-flight branch instructions in an instruction pipeline of a processor (e.g., confidence fields $121a\text{-}m$ configured to store confidence levels associated with in-flight branch instructions, based for example, on the count values provided by counters $107a\text{-}n$ configured to predict direction of the in-flight branch instructions). The apparatus can further include means for determining numbers of in-flight branch instructions associated with each of the confidence levels (e.g., blocks 110A-C of throttler 110), means for determining a weighted sum of the two or more counts weighted with weights corresponding to the confidence levels (e.g., weighted sum 120), means for comparing the weighted sum with a threshold (e.g., comparator 122), and means for providing a throttling signal to indicate that instructions are to be throttled in a pipeline stage of the instruction pipeline, based on the comparison (e.g., throttler 110 configured to assert throttle 102 to indicate that instruction pipeline 112 is to be throttled in a pipeline stage).

Figure 3:
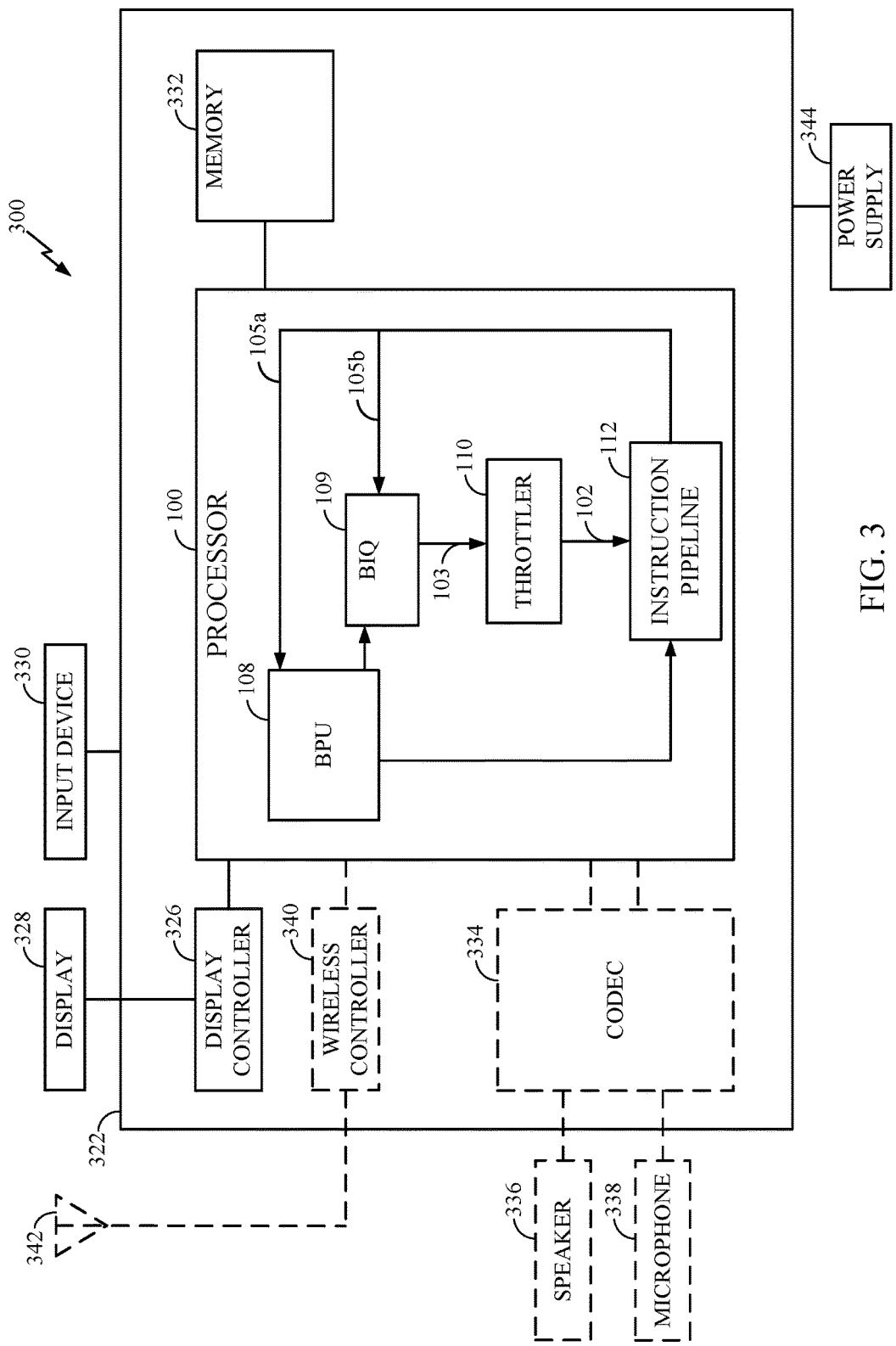
FIG. 3 illustrates an exemplary computing device, in which an aspect of the disclosure may be advantageously employed.

Referring now to FIG. 3, a block diagram of a computing device that is configured according to exemplary aspects is depicted and generally designated 300. In some aspects, computing device 300 may be configured as a wireless communication device. As shown, computing device 300 includes processor 100 of FIG. 1, which may be configured to implement method 200 of FIG. 2 in some aspects.

Figure 1B:
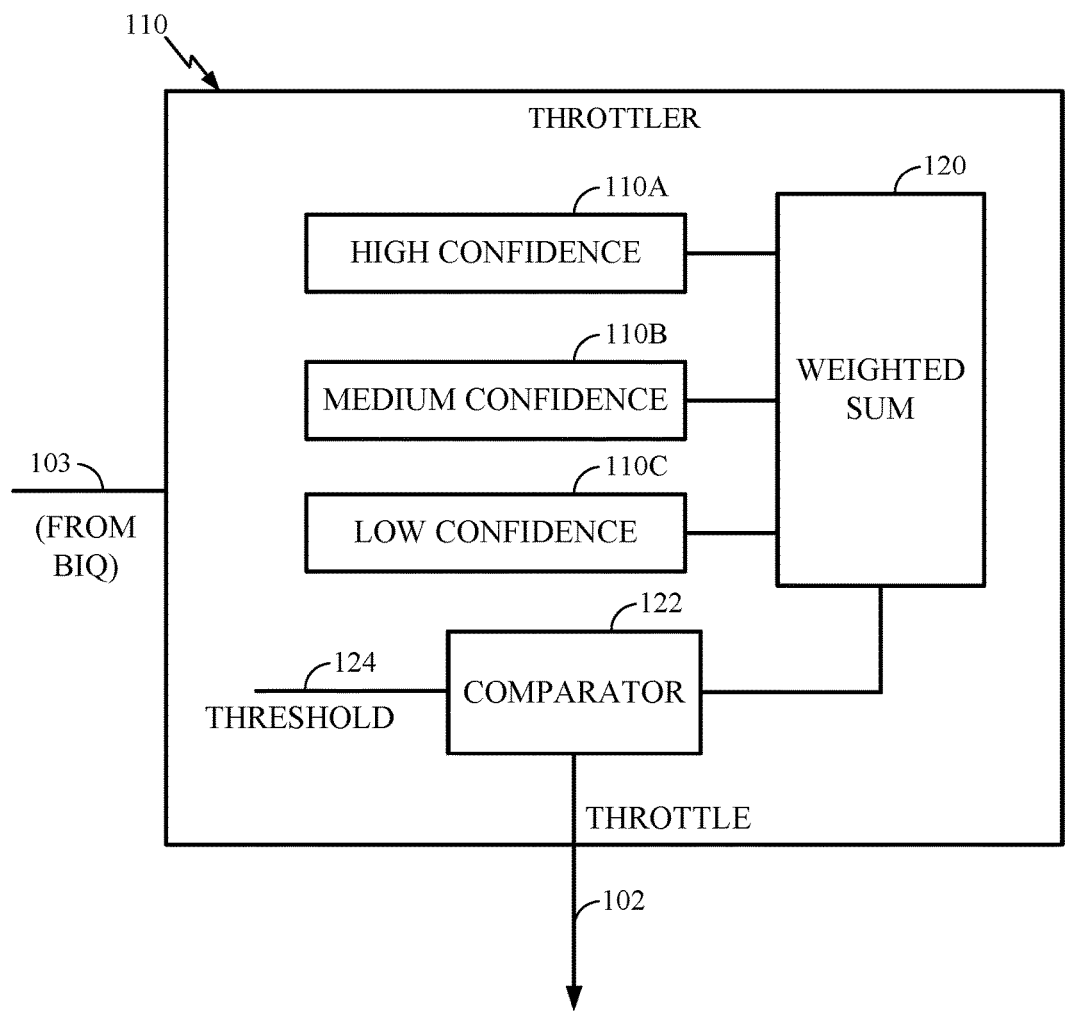
FIG. 1B illustrates a throttler according to an exemplary aspect of this disclosure.

Processor 100 is shown to comprise instruction pipeline 112, BPU 108, BIQ 109, and throttler 110 as discussed with reference to FIGS. 1A-B. Other details (e.g., counters $107a\text{-}n$, entries $120a\text{-}m$, confidence fields $121a\text{-}m$, blocks 110A-C, weighted sum 120, comparator 122, etc.) of these blocks which were previously described with reference to FIGS. 1A-B have been omitted from this view of processor 100 for the sake of clarity.

Processor 100 may be communicatively coupled to memory 332. Computing device 300 also include display 328 and display controller 326, with display controller 326 coupled to processor 100 and to display 328.

In some aspects, FIG. 3 may include some optional blocks showed with dashed lines. For example, computing device 300 may optionally include coder/decoder (CODEC) 334 (e.g., an audio and/or voice CODEC) coupled to processor 100; speaker 336 and microphone 338 coupled to CODEC 334; and wireless controller 340 (which may include a modem) coupled to wireless antenna 342 and to processor 100.

In a particular aspect, where one or more of the above-mentioned optional blocks are present, processor 100, display controller 326, memory 332, CODEC 334, and wireless controller 340 can be included in a system-in-package or system-on-chip device 322. Input device 330, power supply 344, display 328, input device 330, speaker 336, microphone 338, wireless antenna 342, and power supply 344 may be external to system-on-chip device 322 and may be coupled to a component of system-on-chip device 322, such as an interface or a controller.

It should be noted that although FIG. 3 depicts a computing device, processor 100 and memory 332 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for operating a processor by applying dynamic pipeline throttling using confidence-based weighting of inflight branch instructions. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of operating a processor, the method comprising:
   setting an initial confidence entry in a branch instruction queue (BIQ) for in-flight branch instructions;
   determining confidence levels associated with each of the in-flight branch instructions in an instruction pipeline of the processor;
   determining numbers of in-flight branch instructions associated with each category of the confidence levels;
   associating a weight with each one of the numbers of in-flight branch instructions associated with each of the confidence levels, to form weighted numbers;
   determining a weighted sum corresponding to a sum of each of the weighted numbers based on the category of the in-flight branch instructions and the number of in-flight branch instructions in each category;
   comparing the weighted sum with a threshold; and
   providing a throttling signal to indicate that instructions are to be throttled in a pipeline stage of the instruction pipeline, based on the comparison.

2. The method of claim 1, wherein the confidence levels comprise high, medium, and low confidence levels.

3. The method of claim 2, comprising assigning higher weights for numbers associated with low and medium confidence levels, compared to weights for numbers associated with high confidence levels.

4. The method of claim 1, comprising determining the confidence levels from counters used for predicting direction of the in-flight branch instructions.

5. The method of claim 4, comprising storing the confidence levels in confidence fields associated with entries of the branch instruction queue (BIQ) for tracking the in-flight branch instructions.

6. The method of claim 5, comprising creating an entry for an in-flight branch instruction in the BIQ, upon accessing a branch prediction unit comprising the counters, for determining a prediction of the in-flight branch instruction.

7. The method of claim 6, comprising deleting the entry based on an indication that the in-flight branch instruction has resolved in the instruction pipeline.

8. The method of claim 5, wherein the entries comprise addresses and predictions of the in-flight branch instructions.

9. The method of claim 5, comprising assigning a confidence level of a confidence field corresponding to a counter newly allocated to an in-flight branch instruction, to reflect a high confidence level for the confidence field.

10. The method of claim 4, wherein the counters comprise 3-bit signed counters.

11. The method of claim 10, wherein the 3-bit signed counters are incremented when corresponding in-flight branch instructions evaluate to taken, and decremented when corresponding in-flight branch instructions evaluate to not-taken.

12. The method of claim 1, comprising throttling instructions in a fetch stage or an issue stage of the instruction pipeline based on the throttling signal.

13. The method of claim 1, comprising throttling instructions in a pipeline stage of the instruction pipeline based on the throttling signal, if the weighted sum is greater than the threshold.

14. The method of claim 1, wherein the threshold is based on behavior of branch instructions in a unit number of previously committed instructions in the instruction pipeline.

15. The method of claim 14, wherein the threshold is based on a number of mispredictions of branch instruction in a thousand previously committed instructions.

16. An apparatus comprising:
   confidence fields configured to store confidence levels associated with in-flight branch instructions in an instruction pipeline;
   a branch instruction queue (BIQ) configured to set an initial confidence entry in the branch instruction queue (BIQ) for in-flight branch instructions; and
   a throttler comprising:
      confidence level blocks configured to determine numbers of the in-flight branch instructions associated with each of the confidence levels;
      associate a weight with each one of the numbers of in-flight branch instructions associated with each of the confidence levels, to form weighted numbers;
      a weighted sum block configured to determine a weighted sum corresponding to a sum of the weighted numbers based on the category of the in-flight branch instructions and the number of in-flight branch instructions in each category; and
      a comparator configured to compare the weighted sum with a threshold and provide a throttling signal to indicate that instructions are to be throttled in a pipeline stage of the instruction pipeline, based on the comparison.

17. The apparatus of claim 16, wherein the confidence levels comprise high, medium, and low confidence levels.

18. The apparatus of claim 17, wherein higher weights are assigned for numbers associated with low and medium confidence levels, compared to weights for numbers associated with high confidence levels.

19. The apparatus of claim 16, comprising a branch prediction unit (BPU) configured to predict direction of the in-flight branch instructions based on counters, wherein the confidence levels associated with in-flight branch instructions are based on count values of the counters.

20. The apparatus of claim 19, wherein the BIQ comprises the confidence fields and entries configured to track the in-flight branch instructions, wherein the confidence fields are associated with the entries.

21. The apparatus of claim 20, wherein the entries comprise addresses and predictions of the in-flight branch instructions.

22. The apparatus of claim 19, wherein the counters comprise 3-bit signed counters.

23. The apparatus of claim 22, wherein the 3-bit signed counters are configured to be incremented when corresponding in-flight branch instructions evaluate to taken, and wherein the 3-bit signed counters are configured to be decremented when corresponding in-flight branch instructions evaluate to not-taken.

24. The apparatus of claim 23, wherein a confidence field is configured to store a confidence level associated with a counter newly allocated to an in-flight branch instruction as high confidence.

25. The apparatus of claim 16, wherein the instruction pipeline is configured to be throttled in a fetch stage or an issue stage of the instruction pipeline based on the throttling signal.

26. The apparatus of claim 16, wherein the threshold is based on behavior of branch instructions in a unit number of previously committed instructions in the instruction pipeline.

27. The apparatus of claim 26, wherein the threshold is based on a number of mispredictions of branch instruction in a thousand previously committed instructions.

28. The apparatus of claim 16, integrated into a device selected from the group consisting of a set top box, music player, video player, entertainment unit, navigation device, communications device, personal digital assistant (PDA), fixed location data unit, and a computer.

29. An apparatus comprising:
  means for setting an initial confidence entry for in-flight branch instructions;
  means for storing confidence levels associated with each of the in-flight branch instructions in an instruction pipeline of a processor;
  means for determining numbers of in-flight branch instructions associated with each category of the confidence levels;
  determining a weighted sum corresponding to a sum of weighted numbers, wherein a weight is associated with each one of the numbers of in-flight branch instructions associated with each of the confidence levels, to form weighted numbers based on the category of the in-flight branch instructions and the number of in-flight branch instructions in each category;
  means for comparing the weighted sum with a threshold; and
  means for providing a throttling signal to indicate that instructions are to be throttled in a pipeline stage of the instruction pipeline based on the comparison.

30. The apparatus of claim 29, wherein the confidence levels comprise high, medium, and low confidence levels and the initial confidence entry is set to the high confidence level.

* * * * *